3,285,928
MERCURY DERIVATIVES OF PROPYL-
HYDANTOINS
Franklyn W. Gubitz, Nassau, N.Y., assignor to Sterling
Drug Inc., New York, N.Y., a corporation of Delaware
No Drawing. Filed Aug. 23, 1965, Ser. No. 481,913
11 Claims. (Cl. 260—299)

The instant application is a continuation-in-part of my copending application Serial No. 106,483, filed May 1, 1961, and now abandoned.

This invention relates to compositions of matter classified in the art of chemistry as mercurated propylhydantoins.

The invention sought to be patented, in its composition aspect, is described as residing in the concept of a chemical compound having a molecular structure in which there is attached, to the propyl group of a propylhydantoin in either the 1-, 3-, or 5-position of the hydantoin ring, a mercury atom bearing an anion in the 3-position, and, an oxy-functional group in the 2-position, thereby to form a 1-, 3-, or 5-(3-mercuri-2-oxypropyl)-hydantoin. The compounds of this invention thus all possess a 3-mercuri-2-oxypropylhydantoin nucleus wherein a divalent mercury atom links an anion to the terminal carbon atom of an oxypropyl group and the remaining oxy valence is satisfied by a monovalent organic radical.

The tangible embodiments of the invention possess the inherent applied use characteristics of exerting a diuretic effect in animals, as determined by standard animal evaluation procedures. Extensive pharmacological evaluation of the compounds of the invention has shown that they are valuable diuretics. Administered orally to dogs at non-toxic dose levels, the compounds produced outstanding diuretic and chloruretic effects; their utility is thus indicated in the treatment of edematous conditions. Also, they are useful as intermediates for the preparation of diuretically-active compounds, as discussed more fully hereinafter.

Tangible embodiments of the inventive concept can be represented by Formula I

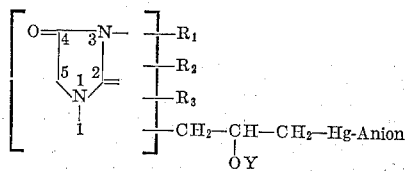

wherein one of the free valences at either the 1-, 3-, or 5-position of the hydantoin ring is satisfied by the 3-mercuri-2-oxypropyl grouping

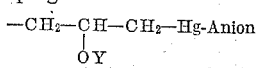

and the remaining free valences, at either the 1-, 3-, or 5-position, are satisfied by the radicals $R_1$, $R_2$ and $R_3$, which can be the same or different, and are hydrogen or any monovalent organic radical, among which, for purposes of illustration, can be lower-alkyl, monocyclic-aryl-lower-alkyl, mono-cyclicaryl, or monocyclic aralkyl.

A preferred class, because of their easy accessibility, of the groups $R_1$, $R_2$ and $R_3$ comprises hydrogen; lower-alkyl; and, benzyl or phenyl, substituted by from 0 to 3 halo, lower-alkyl, or alkoxy groups. Representative examples of the preferred class of the groups $R_1$, $R_2$ and $R_3$ include hydrogen, methyl, ethyl, propyl, phenyl, p-chlorophenyl, p-bromophenyl, p-fluorophenyl, 3,4-dichlorophenyl, p-tolyl, p-methoxy-phenyl, and 2,4,5-trimethylphenyl.

As used herein, the term "lower-alkyl" means straight- or branched-chain alkyl of from one to four carbon atoms, for example, methyl, ethyl, propyl, isopropyl, isobutyl and n-butyl. The term "monocyclic-aryl-lower-alkyl" means "lower-alkyl" as defined hereinabove, and "monocyclic-aryl" means an aromatic carbocyclic or heterocyclic radical containing no more than six atoms in the aromatic ring and carrying from zero to three substituents, for example, lower-alkyl, halogen, nitro, carbalkoxy, alkoxy, alkylmercapto, tri-fluoromethyl, and lower-alkylsulfonyl. Examples of "monocyclic-aryls" are: phenyl, pyridyl, thienyl, furyl, o-tolyl, p-anisyl, 2,4-dinitrophenyl, p-chlorophenyl, and 5-methyl-2-pyridyl. The term "monocyclic-aralkyl" means "monocyclicaryl" as defined hereinabove chemically bonded through an alkylene group containing from one to four carbon atoms. As used herein, the term "oxy" refers to the divalent —O— radical.

As used herein, "Y" means hydrogen or the organic portion of an alcoholic hydroxylic solvent, YOH, preferably containing from one to six carbon atoms, for example, methanol, ethanol, 1-propanol, 2-propanol, 1-butanol, 2-methyl-1-propanol, 2-butanol, 2-methyl-2-propanol, 1-pentanol, 3-methyl-1-butanol, 2-methyl-2-butanol, 2-pentanol, 3-pentanol, 2-methoxyethanol, ethylene glycol, 2-ethoxy-ethanol, glycerol, ethylenechlorohydrin, and ethylenebromohydrin. "Y" means methyl, ethyl, propyl, isopropyl, butyl, methoxyethyl, hydroxyethyl, ethoxyethyl, 2,3-dihydroxypropyl, 2-chloroethyl, 2-bromoethyl, and so forth. Any alcoholic hydroxylic solvent, containing from one to six carbon atoms, substituted or unsubstituted, is suitable so long as it reacts across the double bond of the allyl group as shown herein. The type of substituents present in the alcoholic hydroxylic solvent are immaterial so long as they do not adversely affect the addition of the —OY group across the double bond. The olefinic double bond of the allyl group under the conditions of the process of this invention reacts with water to add a hydroxyl group across the double bond, or with the alcoholic hydroxylic solvent to add the corresponding ether group across the double bond. In the presence of mercury salts and a small quantity of concentrated nitric acid, as shown herein in the examples, this addition is even more pronounced.

As used herein, the term "Anion" means any monovalent ion derived from an organic or inorganic acid, HAnion, by the removal of an acidic hydrogen ion. Exemplary anions are, halide, hydroxy, alkanoate, nitrate, alkylsulfonate, arylsulfonate, alkylmercapto, arylmercapto, aryloxy, theophyllinyl, and succinimido. Other monovalent anions are found in the literature for example, Hackh's Chemical Dictionary, 3rd Edition (1946), at pages 12–13, and Chemical Abstracts, vol. 56, Nomenclature, at pages 72n–80n, both incorporated herein by specific reference thereto.

The acids, HAnion, from which the anions are derived, are preferably those acids which produce, when combined as shown herein, medicinally acceptable salts, that is, salts whose anions are relatively innocuous to the animal organism in medicinal doses of the salts, so that the beneficial physiological or desired diuretic properties are not vitiated by side effects ascribable to the anions. Although pharmaceutically acceptable salts are preferred, all salts having any anion whatsoever are useful as sources for salts having beneficial physiological or diuretic effects even if the particular salt per se is derived only as an intermediate product as, for example, when the salt is formed only for purposes of purification or identification, or when it is used as an intermediate in preparing a medicinally acceptable salt by ion exchange procedures. Therefore, the term anion includes all anions without regard to whether or not all anions could be used with diuretics which are to be taken internally. As is known, one anion can be changed to another anion by use of conventional ion exchange methods.

Any diuretic compound disclosed herein, having an anion which conceivably might be deleterious to the animal or negate the activity of the compound, if taken internally, can always be used as an intermediate to make other compounds within the scope of the disclosure and claims having anions which are not deleterious. Therefore, the compounds of this invention are useful as either diuretics or diuretic intermediates. The anion is merely an anion which satisfies the valence requirement of the mercuric ion. As a class, the most desirable anions are those which give rise to physiologically acceptable diuretic compounds. The most desirable anions are, of course, the physiologically acceptable anions, physiologically compatible anions, or mutually compatible anions, but the scope of the compounds herein described and claimed is in no way to be thereto restricted.

The starting materials for the 1-, 3-, or 5-(3-mercuri-2-oxypropyl) hydantoins represented by Formula I have the following general formulae:

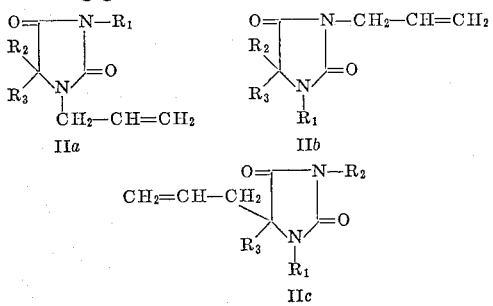

where $R_1$, $R_2$ and $R_3$ have the meanings given above.

The above allylhydantoin starting material can be conveniently prepared by the acid-catalyzed cyclization of the proper hydantoic acid; thus, 1-allylhydantoins of the Formula IIa above are prepared from 3-allylhydantoic acids as in Formula IIIa:

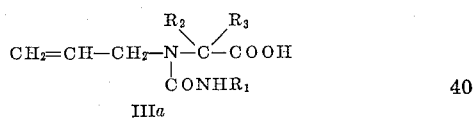

Similarly, 3-allylhydantoins of Formula IIb above can be prepared from 5-allylhydantoic acids (Formula IIIb),

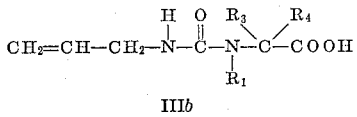

and the 2-allylhydantoic acids of Formula IIIc yield 5-allylhydantoins on cyclization.

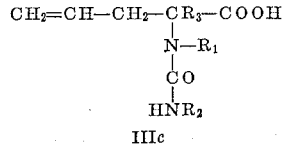

The process for carrying out the cyclization involves heating the allylhydantoic acid in dilute or concentrated mineral acid at temperatures ranging from about 50° C. to about 150° C.

The 3-allylhydantoins of Formula IIb can also be prepared in good yield by alkylating the appropriate hydantoin, unsubstituted in the 3-position, with an allyl halide in the presence of an acid acceptor.

1- and 5-allylhydantoins which are unsubstituted in the 3-position can be alkylated in that position with for example an alkyl halide or sulfate in the presence of an acid acceptor.

The alkylation or allylation of the hydantoin ring is carried out by heating the hydantoin with the alkylating or allylating agent in a suitable solvent, for example a lower-alkanol or a lower alkyl ketone. Although the reaction will proceed slowly at room temperature, it is convenient to carry out the reaction at the boiling point of the solvent selected. The acid acceptor, which is also present in the reaction medium, is a basic substance, for example, alkali-metal hydroxides or alkoxides, alkali-metal carbonates, tertiary-amines, alkali-metal amides and the like, the purpose of which is to take up the hydrogen halide or hydrogen sulfate which is formed during the course of the reaction. The acid acceptor preferably forms a by-product which is easily separable from the rest of the reaction mixture.

The 1-, 3-, or 5-(3-mercuri-2-oxypropyl) hydantoins are conveniently prepared by reacting a mercuric salt, preferably mercuric acetate, with the appropriate allyl-hydantoins selected from the group shown in Formulas IIa, b and c. The reaction is carried out at temperatures ranging from 15° C. to about 150° C. in a suitable hydroxylic solvent, as noted hereinbefore, for example, water, methanol, ethanol, n-propanol, isopropyl alcohol, n-butanol, ethylene glycol; and monoethers of ethylene glycol. The reaction takes place at room temperature, but it is convenient to warm the mixture initially to facilitate dissolving the mercuric salt and the allylhydantoin.

The 1-, 3-, or 5-(3-mercuri-2-oxypropyl) hydantoins formed by the reaction correspond to the following formulas:

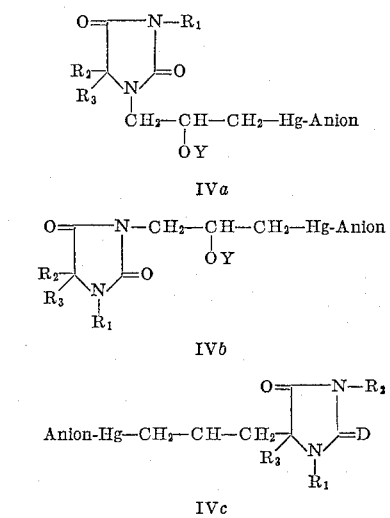

wherein Y, $R_1$, $R_2$, $R_3$, and the Anion are as described hereinabove with reference to Formula I.

When mercuric acetate is the mercurating agent, the anion of the product first formed is acetoxy. The product wherein the anion is hydroxyl can be prepared by treating the acetoxy compound with an aqueous solution of an alkali metal hydroxide. The compounds wherein the anion is hydroxyl can then be treated with any desired acid, HAnion, to produce the corresponding compound bearing the desired anion.

Alternatively, when solubility-product relationships are favorable, a mercurial bearing a desired anion may be obtained by a simple metathetical reaction of the acetoxymercuri compound with a salt of the desired anion. For example, 1-(3-acetoxymercuri-2-methoxypropyl) hydantoin, when treated with a solution of sodium chloride, gives 1 - (3-chloromercuri-2-methoxypropyl) hydantoin and sodium acetate.

The best mode contemplated by the inventor of carrying out the invention will now be set forth as follows:

PREPARATION OF STARTING MATERIALS

*Preparation A.—3-allylhydantoic acid*

N-allylglycine (9.4 g., 0.08 mole) was dissolved in a solution containing 8.2 g. (0.1 mole) of potassium cyanate in 25 ml. of water. Upon acidification of the solution, 9.3 g. of crude product were precipitated. One recrystallization from isopropyl alcohol yielded 5.3 g. (41% of theoretical) of white prisms, M.P. 105–110° C. (dec.) (corr.).

Analysis.—Calcd. for $C_6H_{10}N_2O_3$: N, 17.7; N.E., 158. Found: N, 17.8; N.E., 161.

*Preparation B.—1-allylhydantoin*

[Formula IIa; $R_1=R_2=R_3=H$]

Ethyl N-allylglycinate (48.3 g., 0.337 mole) and nitrourea (36.8 g., 0.34 mole) were dissolved in 300 ml. of ethanol and allowed to stand overnight at room temperature. The solution was then warmed and evaporated to dryness. To the residue which was ethyl 3-allylhydantoate was added 75 ml. of 25% hydrochloric acid, and the solution was heated on a steam bath for two hours. After removing the water and excess hydrochloric acid in vacuo, the dried yellow residue was recrystallized from n-butanol. The crude yield of product melting at 91–96° C. (uncorr.), was 41 g. Further recrystallization from n-butanol yielded 1-allylhydantoin in the form of blade-shaped crystals, M.P. 94.6–98.4° C. (corr.).

Analysis.—Calcd. for $C_6H_8N_2O_2$: C, 51.42; H, 5.75; N, 20.00. Found: C, 51.45; H, 5.99; N, 19.75.

Preparation C, 1-allylhydantion, can also be prepared by the following procedure: Suspend 26.5 g. (0.1675 mole) of 3-allylhydantoic acid (preparation given above) in 50 ml. of concentrated hydrochloric acid and heat at about 90° C. for 1.5 hours. Remove the water from the solution and recrystallize the dry residue from n-butanol. The product crystallizes in the form of clusters of colorless blades. The melting point is given above.

*Preparation D.—3-allyl-5,5-dimethylhydantoin*

[Formula IIb; $R_1=H$; $R_2=R_3=CH_3$]

A solution of sodium methoxide in methanol was prepared by adding 4.6 g. (0.2 mole) of sodium portionwise to 500 ml. of absolute methanol. Commercial 5,5-dimethylhydantoin (25.6 g., 0.2 mole) was added with stirring, and 25.4 g. (0.21 mole) of allyl bromide was then added rather rapidly. The mixture was refluxed for 5.6 hours, and the solvent was stripped off in vacuo. After extracting the product with ether and evaporating the solvent, the oily residue was crystallized from ether-pentane. Repeated recrystallization from the same solvent couple yielded 8.1 g. of white blade-shaped crystals melting at 60.8–70.4° C. (corr.)

Analysis.—Calcd. for $C_8H_{12}N_2O_2$: C, 57.12; H, 7.19; N, 16.66. Found: C, 57.08; H, 7.41; N, 16.60.

*Preparation E.—3-allyl-1-methylhydantoin*

[Formula IIb; $R_1=CH_3$; $R_2=R_3=H$]

Following the procedure outlined above for the preparation of 3-allyl-5,5-dimethylhydantoin, there was obtained from 51 g. (0.5 mole) of 1-methylhydantoin 72.6 g. (0.6 mole) of allyl bromide, and 35 g. (0.65 mole) sodium methoxide in 500 ml. of absolute methanol a yield of 35.5 g. of 3-allyl-1-methylhydantoin as a colorless oil boiling in the range of 68.71° C. (0.08 mm.). An analytical sample of the compound prepared according to this procedure was redistilled; B.P. 73–76° C. at 0.13 mm. of Hg.

Analysis.—Calcd. for $C_7H_{10}N_2O_3$: C, 54.53; H, 6.54; N, 18.17. Found: C, 54.56; H, 6.66; N, 18.03.

*Preparation F.—1-allyl-3-methylhydantoin*

[Formula IIa; $R_1=CH_3$; $R_2=R_3=H$]

Calcined potassium carbonate (27.6 g., 0.2 mole) was ground to a powder and suspended in a solution containing 14.0 g. (0.1 mole) of 1-allylhydantoin (preparation given above) in 500 ml. of dry acetone. After the mixture had been refluxed for 1 hour, 28.4 g. (0.2 mole) of methyl iodide was added, and refluxing was continued for 12 hours. The mixture was filtered, and the filtrate was concentrated in vacuo to a yellow oil. The crude product was separated from the inorganic salts by extraction with ether. The residue left on evaporation of the ether was distilled at 77–78° C. at 0.1 mm. of Hg to give a yellow oil which on redistillation boiled at 71–73° C. at 0.08 mm. of Hg. The yield of 1-allyl-3-methylhydantoin as a colorless oil $n_D^{25}$ 1.4970, was 12.9 g.

Analysis.—Calcd. for $C_7H_{10}N_2O_2$: C, 54.53; H, 6.54; N, 18.17. Found: C, 54.74; H, 6.42; N, 18.11.

*Preparation G.—5-allyl-3-methylhydantoin*

[Formula IIc; $R_1=R_2=H$; $R_3=CH_3$]

Following the procedure outlined above for the preparation of 1-allyl-3-methylhydantoin, there was obtained from 14.0 g. (0.1 mole) of 5-allylhydantoin, 28.4 g. (0.2 mole) of methyl iodide, 27.6 g. (0.2 mole) of calcined potassium carbonate and 250 ml of acetone a yield, after recrystallization from ether, of 11.0 g. of 5-allyl-3-methylhydantoin as white needles, M.P. 90–92° C. (corr.).

Analysis.—Calcd. for $C_7H_{10}N_2O_2$: C, 54.53; H, 6.54; N, 18.17. Found: C, 54.23; H, 6.55; N, 18.11.

Following the procedures outlined above there can be prepared other allylhydantoins substituted in the 1-, 3- and 5-positions by alkyl groups containing between one and four carbon atoms in the alkyl chain and by monocyclic-aryl-lower-alkyl groups which can be substituted in the aryl nucelus by up to three substituents. Exemplary of such allylhydantoins are 1-allyl-3-benzylhydantoin,
1-allyl-3-butylhydantoin,
1-allyl-3,5,5-trimethylhydantoin,
1-allyl-3-(4-chlorobenzyl)-5,5-dimethylhydantoin,
3-allyl-1-propylhydantoin,
3-allyl-1-phenyl-5,5-dimethylhydantoin,
3-allyl-5-ethylhydantoin,
3-allyl-5-(4-chlorophenyl)hydantoin,
5-allyl-1,3-dimethylhydantoin,
5-allyl-3,5-diethylhydantoin,
5-allyl-3-benzyl-1-methylhydantoin, and
5-allyl-1-methylhydantoin.

PREPARATION OF FINAL PRODUCTS

*Example 1.—1-(3-chloromercuri-2-methoxypropyl) hydantoin*

[Formula IVa; $R_1=R_2=R_3=H$; $Y=CH_3$; Anion=Cl]

A solution containing 4.2 g. (0.3 mole) of 1-allylhydantoin in 100 ml. of methanol was mixed with 9.6 g. (0.03 mole) of mercuric acetate in 50 ml of hot methanol, and the resulting solution was treated with two drops of concentrated nitric acid. On standing at 25°, solid 1-(3-acetoxymercuri-2-methoxypropyl)hydantoin precipitated. An additional 50 ml. of methanol was added to dissolve the precipitate. The addition of a solution containing 3 g. of sodium chloride in 10 ml. of water to the methanolic solution caused the precipitation of the 1-(3-chloromercuri - 2 - methoxypropyl)hydantoin which was collected and recrystallized once from water. The product thus obtained weighed 11.8 g. (96 percent of theory) and melted at 154.4–157.6° C. (corr.) with decomposition.

Analysis.—Calcd. for $C_7H_{11}ClHgN_2O_3$: C, 20.64; H, 2.72; N, 6.88; Hg, 49.26. Found: C, 20.99; H, 2,59; N, 6.82; Hg, 49.50.

*Example 2.—5-(3-chloromercuri-2-methoxypropyl) hydantoin*

[Formula IVc; $R_1=R_2=R_3=H$; $Y=CH_3$; Anion=Cl]

Following the procedure outlined in Example 1 above, there was obtained from 4.2 g. (0.03 mole) of 5-allylhydantoin, and 9.6 g. (0.03 mole) of mercuric acetate in 300 ml. of methanol a white, chalky precipitate consisting of 5-(1-acetoxymercuri - 2 - methoxypropyl)hydantoin. The precipitate was dissolved in dilute acetic acid and treated with 3.5 g. (0.06 mole) of sodium chloride in 50 ml. of water. On cooling, the solution deposited 9.8 g. of white needles which, after one recrystillization from 100 ml. of 1:1 dimethylformamide and water yielded 8.7 g. of 5-(3-chloromercuri-2-methoxypropyl)hydantoin, M.P. 165.2–166.2° C. (corr.) (dec.)

*Analysis.*—Calcd. for $C_7H_{11}ClHgN_2O_3$: C, 20.64; H, 2.72; N, 6.88; Hg, 49.26. Found: C, 20.57; H, 2.71; N, 6.90; Hg, 48.3.

*Example 3.—3-(3-chloromercuri-2-methoxypropyl) hydantoin*

[Formula IV$b$; $R_1=R_2=R_3=H$; $Y=CH_3$; Anion=Cl]

Following the procedure given in Example 1 above, there was prepared from 5.6 g. (0.04 mole) of 3-allylhydantoin and 12.8 g. (0.04 mole) of mercuric acetate in 200 ml. of methanol a solution of 3-(1-acetoxymercuri-2-methylpropyl)hydantoin. A test for mercuric ion using 2 N sodium hydroxide solution indicated that methoxymercuration was complete in a few minutes. A solution containing 4.6 g. (0.08 mole) of sodium chloride was added, and the resulting solution was concentrated to one-half its volume by warming on a steam bath. On cooling 3-(3-chloromercuri-2-methoxypropyl)hydantoin separated, and after recrystallization from water, the white prismatic crystals melted at 144.2–146.0° C. (corr.).

*Analysis.*—Calcd. for $C_7H_{11}ClHgN_2O_3$: C, 20.64; H, 2.72; Hg, 49.26. Found: C, 20.48; H, 3.42; Hg, 49.00.

*Example 4.—3-(3-chloromercuri-2-methoxypropyl)- 5-5-dimethylhydantoin*

[Formula IV$b$; $R_1=H$; $R_2=R_3=Y=CH_3$; Anion=Cl].

Following the procedure given in Example 1 there was obtained from 0.03 mole of each 3-allyl-5,5′-dimethylhydantoin and mercuric acetate in 100 ml. of methanol a solution of 3-(3-acetoxymercuri-2-methoxypropyl)-5,5-dimethylhydantoin. Following treatment with sodium chloride solution an oil was obtained which was crystallized from ethyl acetate. The product, 3-(3-chloromercuri-2-methoxypropyl)-5,5-dimethylhydantoin, was collected as white microprisms, M.P. 114.0–116.2° C. (corr.).

*Analysis.*—Calcd. for $C_9H_{15}ClHgN_2O_3$: N, 6.44; Hg, 46.08. Found: N, 6.42; Hg, 45.50.

*Example 5.—5-(3-chloromercuri-2-methoxypropyl)- 3-methylhydantoin*

[Formula IV$c$; $Y=R_2=CH_3$; $R_1=R_3=H$; Anion=Cl].

Following the procedure shown in Example 1, 3.5 g. (0.023 mole) of 5-allyl-3-methylhydantoin was mercurated with 4.6 g. (0.023 mole) of mercuric acetate in 150 ml. of methanol. The clear solution of 5-(3-acetoxymercuri-2-methoxypropyl)-3-methylhydantoin which resulted was treated with a solution of 5.8 g. (0.1 mole) of sodium chloride in 25 ml. of water, and 5-(3-chloromercuri-2-methoxypropyl)-3-methylhydantoin crystallized as white needles. After recrystallization from aqueous methanol the product melted at 142.4–153.6° C. (corr.).

*Analysis.*—Calcd. for $C_8H_{13}ClHgN_2O_3$: C, 22.81; H, 3.11; Hg, 47.62; N, 6.65. Found: C, 22.60; H, 3.18; Hg, 46.40; N, 6.48.

*Example 6.—1-(3-chloromercuri-2-methoxypropyl)- 3-methylhydantoin*

[Formula IV$a$; $Y=R_1=CH_3$; $R_2=R_3=H$; Anion=Cl].

By the procedure of Example 1, from 4.6 g. (0.023 mole) of mercuric acetate, 3.5 g. (0.023 mole) of 1-allyl-3-methylhydantoin, and 50 ml. of methanol, there was obtained 1 - (3-acetoxymercuri-2-methoxypropyl)-3-methylhydantoin. Addition of 3.0 g. (0.05 mole) of sodium chloride in 10 ml. of water to the methanolic solution and removal of the solvent produced a colorless oil consisting of the corresponding chloro-compound. Chromatographing the oil dissolved in methylene dichloride on a column of silica gel and eluting with 1:4 acetone-ether gave 1 - (3-chloromercuri-2-methoxypropyl)-3-methylhydantoin as white platelets melting at 146.8–149° C. (corr.).

*Analysis.*—Calcd. for $C_8H_{13}ClHgN_2O_3$: C, 22.81; H, 3.11; Hg, 47.62. Found: C, 23.15; H, 3.01; Hg, 46.90.

*Example 7.—3-(3-chloromercuri-2-methoxypropyl)- 1-methylhydantoin*

[Formula IV$b$; $Y=R_1=CH_3$; $R_2=R_3=H$; Anion=Cl].

Using the procedure outlined in Example 1, 3-(3-acetoxymercuri - 2 - methoxypropyl)-1-methylhydantoin was obtained from 7.7 g. (0.05 mole) of 3-allyl-1-methylhydantoin, 10.0 g. (0.05 mole) of mercuric acetate, and 75 ml. of methanol. Addition of 5.8 g. (0.1 mole) of sodium chloride in 25 ml. of water to the methanolic solution and removal of the solvent produced a colorless oil. Chromatographing the oil twice on silica gel, eluting with 1:99 acetone-ether, and recrystallizing from absolute alcohol gave 3 - (3 - chloromercuri - 2-methoxypropyl)-1-methylhydantoin as white needles, M.P. 85.8–86.8° C. (corr.).

*Analysis.*—Calcd. for $C_8H_{13}ClHgN_2O_3$: C, 22.81; H, 3.11; Hg, 47.62; N, 6.65. Found: C, 22.88; H, 2.86; Hg, 47.70; N, 6.55.

The procedures given in the above examples can be used to prepare many mercuripropylhydantoins of Formulas III$a$, III$b$, and III$c$. The table below shows further examples encompassed in the concept of the invention. These examples serve to illustrate the scope of the invention, and are not intended to limit it thereto. The group Y is determined by the mercuration-reaction solvent. The anion can be chosen at will under favorable solubility product conditions by a metathetical reaction of the acetoxymercuri compound, or it may be chosen by reaction of the hydroxymercuri compound with the appropriate acid, H Anion.

| Example | Allylhydantoin Used | Final Product |
|---|---|---|
| 8 | 1-allyl-3-benzylhydantoin | 3-benzyl-1-(3-bromomercuri-2-ethoxypropyl)-hydantoin. |
| 9 | 1-allyl-3-butylhydantoin | 3-butyl-1-(3-hydroxymercuri-2-hydroxypropyl)-hydantoin. |
| 10 | 1-allyl-3,5,5-trimethyl-hydantoin | 1-(3-methylsulfonatomercuri-2-methoxyethoxypropyl)-3,5,5-trimethyl-hydantoin. |
| 11 | 1-allyl-3-(4-chlorobenzyl)-5,5-dimethylhydantoin. | 3-(4-chlorobenzyl)-5,5-dimethyl-1-(3-propionoxymercuri-2-hydroxyethoxypropyl)-hydantoin. |
| 12 | 3-allyl-1-propylhydantoin | 3-(3-carboxymethyl-mercaptomercuri-2-ethoxy-ethoxypropyl)-1-propyl-hydantoin. |
| 13 | 3-allyl-1-phenyl-5,5-dimethylhydantoin. | 5,5-dimethyl-3-(3-phenoxymercuri-2-butoxy-propyl)-1-phenyl-hydantoin. |
| 14 | 3-allyl-5-ethylhydantoin | 5-ethyl-3-(3-theophyllinyl-mercuri-2-(2,3-dihydroxypropoxypropyl)-hydantoin. |
| 15 | 3-allyl-5-(4-chlorophenyl)-hydantoin. | 5-(4-chlorophenyl)-3-(3-nitratomercuri-2-(2-chloro-ethoxy)propylhydantoin. |
| 16 | 3-allyl-1-(2-pyridyl)-hydantoin. | 3-(3-p-toluenesulfonato-mercuri-2-(2-propyloxy)-propyl-1-(2-pyridyl)-hydantoin. |
| 17 | 1-allyl-3-(2-[5-nitro-furyl])hydantoin. | 1-(3-succinimidomercuri-2-methoxypropyl)-3-(2-[5-nitrofuryl])hydantoin. |

Depending upon the position of the substituted propyl substituent on the hydantoin ring, other positions on the hydantoin ring are available for further substitution with substituents without qualitatively affecting the pharmacological effectiveness of the subject matter of this invention. Such other position substituted compounds are, therefore, the full equivalents of the subject matter herein described and claimed.

The subject matter which applicant regards as his invention is particularly pointed out and distinctly claimed as follows:

1. A 3 - mercuri - 2 - oxypropyl - hydantoin compound wherein a divalent mercury atom links a pharmaceutically acceptable anion to the terminal carbon atom of an oxypropyl group and the remaining oxy valence is satisfied by an alkyl, hydroxyalkyl, or haloalkyl group containing from one to six carbon atoms and any substituents present on the hydantoin nucleus are selected from the group consisting of lower-alkyl, monocyclic-aryl-lower-alkyl, monocyclicaryl, or monocyclic aralkyl.

2. A 1-(3-halomercuri-2-alkoxypropyl)hydantoin.
3. A 3-(3-halomercuri-2-alkoxypropyl)hydantoin.
4. A 5-(3-halomercuri-2-alkoxypropyl)hydantoin.
5. 1-(3-chloromercuri-2-methoxypropyl)hydantoin.
6. 3-(3-chloromercuri-2-methoxypropyl)hydantoin.
7. 5-(3-chloromercuri-2-methoxypropyl)hydantoin.
8. 1 - (3-chloromercuri-2-methoxypropyl)-3-methyl-hydantoin.
9. 3 - (3-chloromercuri-2-methoxypropyl)-1-methyl-hydantoin.
10. 5 - (3 - chloromercuri-2-methoxypropyl)-3-methyl-hydantoin.
11. 3 - (3 - chloromercuri - 2 - methoxypropyl)-5,5-dimethyl-hydantoin.

References Cited by the Examiner

Burger: Medicinal Chemistry, (New York, 1960), pages 642–4 and 41 RS403 B8.

ALEX MAZEL, *Primary Examiner.*

NICHOLAS S. RIZZO, *Examiner.*

A. D. ROLLINS, *Assistant Examiner.*